May 21, 1968 M. J. E. GOLAY 3,384,749
PNEUMATIC RADIATION DETECTOR
Filed Aug. 11, 1965
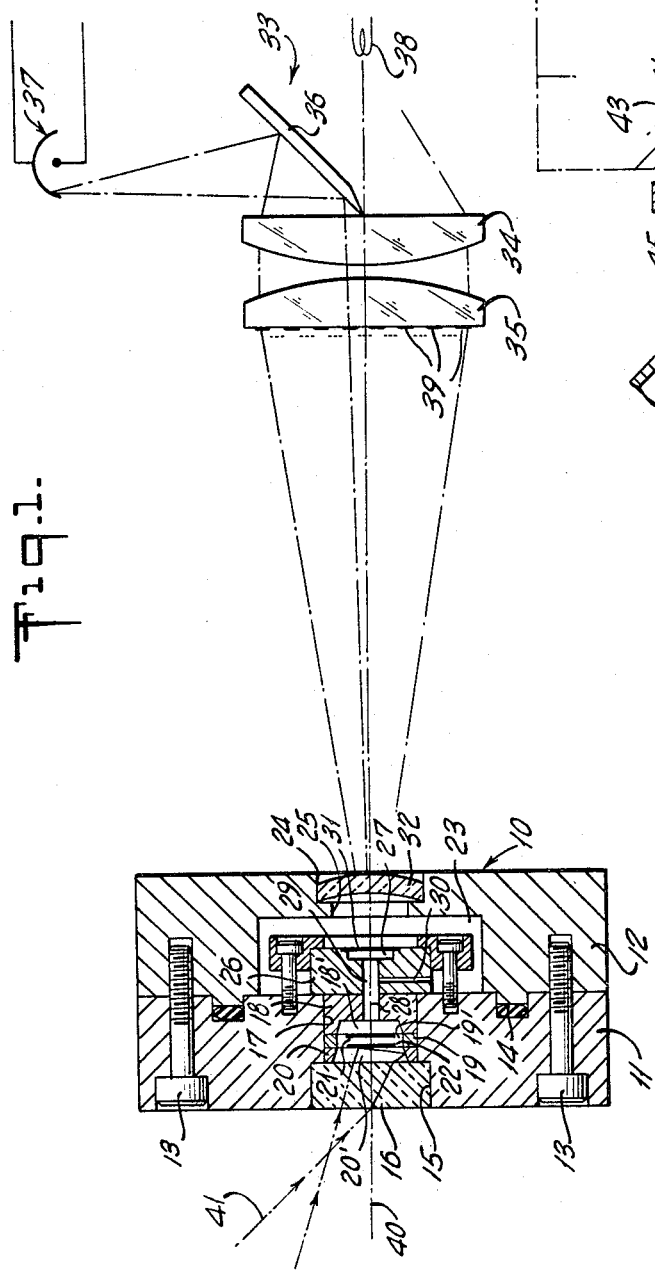
INVENTOR
MARCEL J. E. GOLAY
BY
ATTORNEY 3,384,749
PNEUMATIC RADIATION DETECTOR
Marcel J. E. Golay, 116 Ridge Road,
Rumson, N.J. 07760
Filed Aug. 11, 1965, Ser. No. 478,819
13 Claims. (Cl. 250—83)

ABSTRACT OF THE DISCLOSURE

A pneumatic detector wherein the radiation receiving chamber includes a membrane dividing the chamber into two parts, the membrane being optionally multiple membrane having a radiation coating covering a portion of its area with the remainder being transparent to radiation. The radiation receiving chamber parts may also be tapered to increase the pneumatic energy produced by the transfer of heat to the gas of the chamber.

This invention relates to radiation detectors and more specifically to a novel and improved pneumatic radiation detector having increased sensitivity to infrared and radio microwave radiation and improved signal to noise ratio.

While this invention is particularly useful in pneumatic detectors employing flexible mirrors and associated optical systems for the conversion of radiant energy into electrical energy, it will become apparent that it is also applicable to other forms of detectors as for instance a detector wherein one plate of a condenser is formed of a flexible material which is pneumatically displaced to vary capacity in accordance with changes in the detected radiant energy.

The detection of infrared radiation and particularly long wavelength infrared radiation has been accomplished by several different types of detectors including pneumatic detectors, the latter affording a relatively high frequency response. The conversion of infrared radiation into mechanical energy by varying a gas pressure is a most effective process for the detection of such radiation, though a high degree of care is required to maintain a satisfactory sensitivity and signal to noise ratio. This invention provides an improved arrangement and coordination of elements in a pneumatic detector which enables the attainment of a more effective conversion of radiant energy into mechanical energy, thereby affording improved sensitivity and signal to noise ratio.

A further object of the invention resides in the provision of a novel and improved pneumatic detector for conversion of infrared and radio microwave radiation into mechanical energy.

A still further object of the invention resides in the provision of a novel and improved radiation detector particularly useful for detection of long wavelength infrared and radio microwave radiation.

The above and other objects of the invention will become more apparent from the following description and accompanying drawings forming part of this application.

In the drawings:

FIGURE 1 is a cross sectional view of the pneumatic detector in accordance with the invention.

FIGURE 2 is a cross sectional view of a modified form of a pneumatic radiation detector in accordance with the invention.

Referring now to the drawings and more specifically to FIGURE 1, the pneumatic detector head is generally denoted by the numeral 10 and includes mated housing parts 11 and 12 secured together by screws 13 and sealed by an annular ring 14. The housing part 11 has a recess 15 in the outer face thereof for the receipt of a window 16 transparent to the radiation to be detected and a cylindrical opening 17 extending from the bottom of recess 15 to the inner face of the housing. A cylindrical structure is positioned within the opening 17 and formed of a rear or base member 18 having a recess 18' therein, a central annular or spacer member 19, and a front annular element 20. The three elements 18, 19, and 20 form a chamber immediately behind the window 16. A pair of membranes 21 and 22 divide the chamber into front, central and rear portions 20', 19', and 18' respectively.

The membranes 21 and 22 are exceedingly thin and each membrane has a central circular coating of radiation absorbing material and an uncoated peripheral portion permitting transmission of the radiant energy. The front chamber portion 20' is tapered inwardly from the window 16 to the membrane 22. If desired the annular member 19 and the recess in the rear member 18 may also be tapered substantially as shown in FIGURE 1.

The housing part 12 is provided with an enlarged recess 23 formed in the inner face and a shallow recess 24 formed in the outer face. These recesses are joined by a cylindrical opening 25. Within the recess 23 in the housing part 12, there is an annular member 26 having a shallow central recess 27 which communicates with the recess 18' via registering openings 28 and 29. A smaller pressure equalizing duct 30 extends from the edge of the annular member 26 to communicate with the passage 29. The recess 27 in the annular member 26 is sealed by a thin flexible mirror while the recess or chamber 23 is sealed by a meniscus lens 32.

With the arrangement as described above all of the chambers and passages are filled with a gas which expands when heated and deflects the flexible mirror 31. Deflection of the mirror 31 is sensed by an optical system generally denoted by the numeral 33 which includes a pair of condensing lenses 34 and 35, an angularly disposed mirror 36 and a light sensitive photo cell 37. Light from a suitable source 38 passes through the lower portion of the lenses 34 and 35, the latter carrying a grid 39 on one surface thereto. This light is focused on the flexible mirror 31 and is reflected back through the upper portion of the lenses 34 and 35 whereupon it is again reflected by the mirror 36 onto the light sensitive cell 37. The system is adjusted so that the image of the lamp 38 is properly focused on the light receiving cell. With the flexible mirror 31 in an undeflected or normal position, the grid 39 on the bottom half of the lens 35 is nearly imaged upon the top half of the grid 39 so that a little light reaches the photo cell 37. When the gas in the chamber 18' is heated as a result of incoming radiation, the flexible mirror 31 will be deflected and it in turn will shift the image of the grid so that an incremental amount of light will pass to the mirror 36 and the photo cell 37 which is proportional in magnitude to the amount of radiation detected. The pressure equalizing duct 30 functions to equalize the pressure on both sides of a flexible mirror 31 when there is no change in the magnitude of the radiation being detected.

As mentioned above the radiation receiving chamber 20' has a tapered wall and is substantially larger in diameter than the rear chamber 18'. With this construction a relatively large effective area is provided for the reception of radiation. A further improvement is obtained by tapering the wall of the rear chamber 18' which results in a material reduction in its volume. With this general tapered arrangement, pneumatic energy obtained by the dissipation of the same amount of radiation in a smaller chamber is proportionately larger with the result that a material increase in the signal to noise ratio at the output of photo cell 37, is obtained.

The advantage of the tapered wall structure resides in the utilization of energy entering chamber 20'. By way of illustration, let it be assumed that the walls of the chambers 20', 19', and 18' are at an angle of 15 degrees with the center line 40 of the device. If the incoming radiation entering the window 16 is contained within a total angle of 90 degrees, an extreme ray such as the ray 41 will make an angle of 45 degrees with the axis 40. Under these circumstances the ray 41 will be reflected by the wall of chamber 21' at the angle of 75 degrees with the axis 40 and will be efficiently absorbed by one or more absorbing membranes 21 and 22. Similarly if the incoming radiation subtends a total angle of 60 degrees the chamber walls can be inclined at 22½ degrees which again affords a reflecting angle for the extreme ray of 75 degrees.

Another aspect of the invention resides in the structure and arrangement of the membranes 21 and 22. Each membrane, which in actual practice is of the order of .018 inch in diameter, is coated by a metallic evaporation process through a mask to leave a surrounding uncoated annulus of the order of .025 inch in diameter. When using this improved membrane, improved sensitivity is obtained since radiation which falls on the membrane near the wall of the chamber passes through the annulus and is reflected by the rear wall of the chamber 18' onto the radiation absorbing portion of the membrane. With prior structures utilizing an absorbing coating over the entire membrane, much of this radiant energy was lost through conduction to the housing.

When utilizing two or more coated membranes in accordance with the invention they are preferably provided with different types of coatings. For instance, the front membrane 22 would be coated for relatively higher energy transmission than reflection while the succeeding membrane or membranes would have progressively heavier coatings. For instance when utilizing two membranes as illustrated in FIGURE 1 which are separated by the annular member 19, the front membrane is coated to provide a resistance of the order of the impedance of space, namely, 377 ohms. With this impedance one ninth of the incoming radiation is reflected while four-ninths are absorbed and four-ninths are transmitted. The transmitted portion of this energy impinges upon the rear membrane which is more heavily coated, so that it has a resistance which is typically one quarter of the impedance of space. This causes four-ninths of the radiation passing the first membrane to be absorbed while four-ninths will be reflected and one-ninth transmitted. Furthermore radiation passing the clear annulus of the membrane 22 and reflected toward the more heavily coated membrane 21 will be four-ninths absorbed and four-ninths reflected toward the rear chamber 18'. This reflected energy will be again reflected and when impinging on the second membrane a portion of this remaining fraction will be absorbed. Thus radiation passed by the clear annulus and partially trapped behind the rear membrane 21 will be efficiently absorbed, mostly by the second membrane but also to a lesser extent by the first membrane.

From the foregoing it will be understood that both the improved chamber configuration and membrane structure affords materially improved sensitivity of the device to incoming radiation.

A modified embodiment of the invention is illustrated in FIGURE 2 and corresponding elements in FIGURES 1 and 2 are denoted by like numerals. The form of the invention shown in FIGURE 2 is particularly advantageous for use in connection with a waveguide conveying radiant energy to the detector. In this form of the invention the window 16 of FIGURE 1 is omitted and the tapered recess 43 extends inwardly from the front face of the housing part 11. This arrangement facilitates the attachment of a waveguide 42 to the surface of the housing part 11 by any suitable means, as for instance, a collar 44 fixed to the waveguide and attached to the housing part 11 by means of a plurality of screws 45. For most efficient operation it is desirable to provide a waveguide having an internal diameter substantially equal to the diameter of the recess 43 at the outer face of the housing part 11. Through the formation of the recess 43 in the manner illustrated in FIGURE 2, a very much smaller window 46 is required as its fits in and is bonded to the tapered recess. This is particularly important in the detection of long wave infrared and radio microwaves, since materials having the desired transparency, such as diamonds, are exceedingly expensive. The window 46 is spaced from the membrane 22 to form the sealed chamber 20' as in the case of FIGURE 1. The remaining structure and operation of the device shown in FIGURE 2 is identical to the embodiment shown in FIGURE 1.

While only certain embodiments of the invention have been illustrated and described, it is apparent that alterations, modifications and changes may be made without departing from the true scope and spirit thereof as defined by the appended claims.

What is claimed is:

1. In a pneumatic radiation detector, a gas filled radiation chamber and a membrane within said chamber and dividing it into two parts, said membrane having a central circular portion formed of a radiation absorbing material and an outer annular portion transparent to said radiation, said annular portion separating the absorbing material from the wall of said chamber.

2. In a pneumatic radiation detector, a gas-filled radiation receiving chamber, said chamber having a first portion and a second portion, a membrane separating said chamber portions and a radiation absorbing coating covering at least a portion of the area of said membrane, said chambers having tapered walls to decrease the volume of said chambers so that the radiation absorbed by the membrane and conducted as heat to said gas in both chamber portions produces increased pneumatic energy within the decreased volume of both chamber portions.

3. In a pneumatic radiation detector according to claim 2 wherein said membrane is transparent to radiation and the central portion thereof is provided with said radiation absorbing coating.

4. In a pneumatic radiation detector, a gas-filled radiation receiving chamber, said chamber having a front portion, a central portion and a rear portion, a first membrane formed in part of a radiation absorbing material separating said front and central chamber portions and a second membrane formed in part of a radiation absorbing material separating said central and rear portions of said chamber.

5. In a pneumatic radiation detector, a gas-filled chamber and a pair of spaced membranes dividing said chamber into front, central and rear portions, each of said membranes having a central radiation absorbing portion and an outer portion transparent to radiation and surrounding said radiation absorbing portion.

6. In a pneumatic radiation detector, a gas-filled chamber and a pair of membranes in spaced overlying relationship dividing said chamber into front, central and rear sections, said front and rear sections having tapered walls and said membranes each having a central portion of radiation absorbing material and a peripheral portion transparent to said radiation.

7. In a pneumatic radiation detector, a housing, a chamber formed in said housing and opening in one face thereof, a radiation transparent window closing said chamber, said chamber being in the form of a truncated cone with the end of greater cross sectional area adjoining said transparent window, a membrane formed at least in part of radiation absorbing material positioned transversely within said chamber and dividing it into a front portion adjoining said window and a rear portion, a duct communicating at one end with said rear chamber portion, a flexible element closing the other end of said duct, and a gas filling said rear chamber portion and said duct.

8. In a pneumatic radiation detector according to claim 7 wherein said chamber includes a second membrane in closely spaced relationship to the first said membrane and wherein each of said membranes has a central portion of radiation absorbing material and a surrounding portion transparent to radiation.

9. In a pneumatic radiation detector according to claim tral axis of the chamber in the range of 10° to 30°.

10. In a pneumatic radiation detector according to claim 7 including a waveguide secured to said housing and communicating with said front chamber portion.

11. In a pneumatic radiation detector according to claim 7 wherein said chamber includes a second membrane in closely spaced relationship to the first said membrane, and wherein said chamber wall forms an angle with the axis of said chamber in the range of 10° to 30°.

12. In a pneumatic radiation detector, a housing, a chamber formed in said housing and opening in one face thereof, a radiation transparent window closing said chamber, and a membrane formed at least in part of a radiation absorbing material positioned transversely of said chamber and dividing it into a front portion and a rear portion, said front chamber portion tapering inwardly from the face of said housing to said membrane to increase the pneumatic energy produced within said rear chamber by concentrating the heat generated within said radiation absorbing material and then transferring the heat to the gas filling said rear chamber portions, the last said chamber portion having a smaller volume than the front chamber portion.

13. In a pneumatic detector according to claim 12 wherein said transparent window is positioned within said front chamber portion.

References Cited

UNITED STATES PATENTS

| | | | |
|---|---|---|---|
| 2,643,343 | 6/1953 | Rainwater | 250—83.6 |
| 2,981,840 | 4/1961 | Nahmias | 250—43.5 |
| 3,155,828 | 11/1964 | Golay | 250—43.5 X |
| 3,198,946 | 8/1965 | Atwood | 250—43.5 X |

RALPH G. NILSON, *Primary Examiner.*

A. B. CROFT, *Assistant Examiner.*

UNITED STATES PATENT OFFICE
CERTIFICATE OF CORRECTION

Patent No. 3,384,749                                    May 21, 1968

Marcel J. E. Golay

It is certified that error appears in the above identified patent and that said Letters Patent are hereby corrected as shown below:

Column 3, line 12, ".018" should read -- .18 --.

Signed and sealed this 16th day of December 1969.

(SEAL)
Attest:

Edward M. Fletcher, Jr.                      WILLIAM E. SCHUYLER, JR.
Attesting Officer                                 Commissioner of Patents